United States Patent
Tate

[11] Patent Number: 6,045,905
[45] Date of Patent: Apr. 4, 2000

[54] POLYESTER FILM FOR LAMINATING METAL CAN END SUBSTRATE SURFACE

[75] Inventor: Masashi Tate, Shiga-ken, Japan

[73] Assignee: Mitsubishi Polyester Film Corporation, Tokyo, Japan

[21] Appl. No.: 08/824,534

[22] Filed: Mar. 26, 1997

[30] Foreign Application Priority Data

| Mar. 29, 1996 | [JP] | Japan | 8-103435 |
| Apr. 17, 1996 | [JP] | Japan | 8-095273 |
| Jun. 25, 1996 | [JP] | Japan | 8-184055 |

[51] Int. Cl.$^7$ .......... B32B 15/08; B32B 27/08; B32B 27/36
[52] U.S. Cl. .......... 428/335; 428/35.8; 428/35.9; 428/195; 428/200; 428/201; 428/209; 428/339; 428/458; 428/480; 206/524.2; 206/524.3; 220/626
[58] Field of Search .......... 428/480, 35.8, 428/35.9, 458, 910, 195, 200, 201, 209, 335, 339; 220/626; 206/524.2, 524.3

[56] References Cited

U.S. PATENT DOCUMENTS

| 5,059,460 | 10/1991 | Heyes et al. | 428/35.3 |
| 5,093,208 | 3/1992 | Heyes et al. | 428/623 |
| 5,424,121 | 6/1995 | Murakami et al. | 428/337 |

FOREIGN PATENT DOCUMENTS

| 0 312 302 | 4/1989 | European Pat. Off. . |
| 0 312 304 | 4/1989 | European Pat. Off. . |
| 0 402 004 | 12/1990 | European Pat. Off. . |
| 0 666 168 | 8/1995 | European Pat. Off. . |
| 0 712 718 | 5/1996 | European Pat. Off. . |
| 39 34 904 | 5/1991 | Germany . |
| 4-292941 | 10/1992 | Japan . |
| 4-292942 | 10/1992 | Japan . |
| 2 285 952 | 8/1995 | United Kingdom . |
| 2 286 364 | 8/1995 | United Kingdom . |
| 93/17864 | 9/1993 | WIPO . |
| 96/15906 | 5/1996 | WIPO . |

OTHER PUBLICATIONS

Patent Abstract of Japan, vol. 96, No. 5, (May 31, 1996), abstract of Kimura Masahiro, "White Polyester Film for Metal Plate Laminate and its Production", Japanese 8–003334, (Jan. 9, 1996).

*Primary Examiner*—Vivian Chen
*Attorney, Agent, or Firm*—Foley & Lardner

[57] ABSTRACT

The present invention relates to a coextruded laminated film for laminating the external surface of a metal can end substrate comprising:

- a polyester (A) layer having the ratio of the ethylene terephthalate units or ethylene naphthalate units to the whole ester units of not less than 85 mol %; and
- a polyester (B) layer which is laminated on the external surface of a metal can end substrate, having the ratio of the ethylene terephthalate units or ethylene naphthalate units to the whole ester units of 65 to 90 mol %, having 3 to 50 μm thickness, and

- a printed layer being provided on the surface of the (B) layer of said laminated film at a printed area percentage of not more than 90%, wherein the printed layer directly contacts the metal can end substrate when said film is applied to said substrate. Also disclosed is a pigmented polyester laminating film for the external surface of a beverage can end substrate, said polyester film having a ratio of the maximum to the minimum value of elastic modulus in the in-plane direction of the film of 1.00 to 1.50.

10 Claims, No Drawings

POLYESTER FILM FOR LAMINATING METAL CAN END SUBSTRATE SURFACE

BACKGROUND OF THE INVENTION

The present invention relates to a polyester film for laminating the external surface of a metal can end substrate. More particularly the present invention relates to a polyester film for producing a metal can end with excellent design flexibility.

Presently, there is a demand to elevate the design quality of the metal can ends (including can covers and can lids), especially in the beverage industry, by making a print on the can ends. However, it has been impossible to make a print on the finished metal can ends, and it has also been very difficult mechanically to make a print on the coiled metal used as a metal can end substrates. Hitherto, therefore, there have been taken only the technically restricted measures such that the printed base metal of cut plates is used as can end substrates. Thus, industry scale production of the metal can ends having excellent design aspects such as aesthetic designs is not easy. Also, in the case of cut plate printing, the kind of ink usable is limited as it is required to use an ink with high viscosity for preventing defacing of fine prints. Further the printing method is also restricted to offset printing since printing is conducted on the hard metal surface.

For solving the above these problems, it has been proposed to laminate a thermoplastic resin film having a printing ink layer on the metal can end.

For instance, in Japanese Patent Application Laid-Open (KOKAI) No. 4-292942, there is proposed a laminating film for metal plates, comprising a thermoplastic resin film having a printing ink layer and an adhesive layer composed of a curing resin formed on another side of the thermoplastic resin film. In Japanese Patent Application Laid-Open (KOKAI) No. 4-292941, there is proposed a laminating film for metal plates, comprising a thermoplastic resin film having a printing ink layer and an adhesive layer composed of a curing resin formed on another side of the thermoplastic resin film, a transparent or colored film formed on the surface of the adhesive layer, a heat sealing layer formed on the surface of the said transparent or colored film.

These laminating films, however, have the environmental problem because of the necessity to use a solvent in forming the adhesive layer composed of a curing resin such as epoxy resin and polyurethane resin. The laminating films also involve the problem of the increased number of processes because at least the thermoplastic resin film forming process, resin laminating process and printing process are required as the production process, and the collateral problem of high production cost.

As the results of the present inventors' for solving the above-mentioned problems, it has been found that a polyester film which contains a color pigment and/or a color dye, or printed on at least one surface thereof, and has a thickness of 3 to 50 μm is advantageous in use for laminating the external surface of a metal can end substrate. The present invention has been attained on the basis of this finding.

SUMMARY OF THE INVENTION

An object of the present invention is to provide a beverage metal can end with excellent design quality such as artistic designs at low cost and by simple operations.

Another object of the present invention is to provide a polyester film for laminating the external surface of metal can end substrate, which film can be used as means for imparting high-quality prints on the external surface of a metal can end very easily and inexpensively.

Still another object of the present invention is to provide a film for laminating the external surface of metal can end substrate, which film can be produced by a simple process with no need of using a solvent at low cost.

To accomplish the aims, in a first aspect of the present invention, there is provided a polyester film for laminating the external surface of a metal can end substrate, which contains a color pigment, a color dye or combination thereof, and has a thickness of 3 to 50 μm.

In a second aspect of the present invention, there is provided a polyester film for laminating the external surface of a metal can end substrate, having a thickness of 3 to 50 μm, at least one surface of the laminated film being printed.

In a third aspect of the present invention, there is provided a polyester film for laminating the external surface of a metal can end substrate, which comprises:

a polyester (A) layer having the ratio of the ethylene terephthalate units or ethylene naphthalate units to the whole ester units of not less than 85 mol %; and a polyester (B) layer which is laminated on the external surface of a metal can end substrate, having the ratio of the ethylene terephthalate units or ethylene naphthalate units to the whole ester units of 65 to 90 mol %, and has 3 to 50 μm thickness, a printed layer being formed on the surface of the (B) layer of the said laminated film at a printed area percentage of not more than 90%.

In a fourth aspect of the present invention, there is provided a metal can end comprising a metal can end substrate and a polyester film for laminating the external surface of the metal can end substrate, which contains a color pigment, a color dye or a combination thereof, and has a thickness of 3 to 50 μm.

In a fifth aspect of the present invention, there is provided a metal can end comprising a metal can end substrate and a polyester film for laminating the external surface of the metal can end substrate, having a thickness of 3 to 50 μm, printing being conducted on at least one surface of the film.

In a sixth aspect of the present invention, there is provided a metal can end comprising a metal can end substrate and a polyester film for laminating the external surface of the metal can end substrate, which comprises:

a polyester (A) layer having the ratio of the ethylene terephthalate units or ethylene naphthalate units to the whole ester units of not less than 85 mol %; and a polyester (B) layer which is laminated on the external surface of a metal can end substrate, having the ratio of the ethylene terephthalate units or ethylene naphthalate units to the whole ester units of 65 to 90 mol %, and has 3 to 50 μm thickness, a printed layer being formed on the surface of the (B) layer of the said laminated film at a printed area percentage of not more than 90%.

In a seventh aspect of the present invention, there is provided a metal can having a metal can end comprising a metal can end substrate and a polyester film for laminating the external surface of the metal can end substrate, which contains a color pigment, a color dye or combination thereof, and has a thickness of 3 to 50 μm.

In an eighth aspect of the present invention, there is provided a metal can having a metal can end comprising a metal can end substrate and a polyester film for laminating the external surface of the metal can end substrate, having a thickness of 3 to 50 μm, printing being conducted on at least one surface of the film.

In a ninth aspect of the present invention, there is provided a metal can having a metal can end comprising a metal can end substrate and a polyester film for laminating the external surface of the metal can end substrate, which comprises:

a polyester (A) layer having the ratio of the ethylene terephthalate units or ethylene naphthalate units to the whole ester units of not less than 85 mol %; and a polyester (B) layer which is laminated on the external surface of a metal can end substrate, having the ratio of the ethylene terephthalate units or ethylene naphthalate units to the whole ester units of 65 to 90 mol %, and has 3 to 50 μm thickness, a printed layer being formed on the surface of the (B) layer of the said laminated film at a printed area percentage of not more than 90%.

DETAILED DESCRIPTION OF THE INVENTION

The present invention is described in detail below.

The "metal can end" referred to in the present invention means a can end which is fitted with a metal can body by means of roll drawing as a top end of the metal can. Further, the "metal can end substrate" referred to in the present invention means a end substrate comprising metal substrate. In the ordinary metal can end substrate, coated aluminum, tinplate, tin-free steel and the like are used as base material.

In the case of the metal can end substrates whose outer surface is to be laminated with the polyester film of the present invention, it is not necessary to paint on at least the external surface of the can end where the polyester film of the present invention is laminated, because the metal can end substrate is perfectly laminated with the polyester film. It is preferable that the inner surface of the metal can end substrate is also laminated with the same kind of film, but no print may be made on the formed film of the inside surface of the metal can end substrate.

The polyester used as base material of the colored film or printed film of the present invention has excellent gas barrier properties, which are essential for preventing metal corrosion, and is also free of the problems on food sanitation.

The term "polyester" used in the present invention refers to a polymer which can be obtained by polycondensing a dicarboxylic acid such as terephthalic acid, isophthalic acid, phthalic acid, 2,6-naphthalenedicarboxylic acid, 2,7-naphthalenedicarboxylic acid, 1,4-cyclohexanedicarboxylic acid, adipic acid, sebacic acid or the like, and a diol such as ethylene glycol, diethylene glycol, triethylene glycol, 1,4-butanediol, 1,4-cyclohexanedimethanol, neopentyl glycol or the like.

Preferred examples of the polyesters usable in the present invention are polyethylene terephthalate or its copolymers which have actually been used as material of beverage containers such as bottles and cans, and are relatively inexpensive and also advantageous in terms of food sanitation. In the present invention, the term "polyethylene terephthalate" means a polyester of which the backbone has been formed by condensation of terephthalic acid residue and ethylene glycol residue, and in which the ethylene terephthalate units constitute not less than 95% of the whole ester units.

As the copolymer unit of the polyethylene terephthalate used in the present invention, it is preferred to use the ethylene isophthalate unit which is closely analogous to ethylene terephthalate and capable of processing under the substantially same molding conditions, that is, the ester unit in which isophthalic acid residue and ethylene glycol residue have been condensed together. Also preferable are the copolymer polyesters comprising 2,6-naphthalenedicarboxylic acid, adipic acid or sebacic acid as dicarboxylic acid moiety and diethylene glycol, triethylene glycol, 1,4-butanediol or 1,4-cyclohexanedimethanol as diol moiety. The "ester unit" referred to in the present invention means a unit corresponding to a structure in which one dicarboxylic acid and one diol have been condensed.

In the present invention, the thickness of the colored film and the printed film is 3 to 50 μm, preferably 6 to 15 μm. When the film thickness is less than 3 μm, the film may not have sufficient strength and gas barrier properties. When the thickness is more than 50 μm, it becomes difficult for the film to conform to the deformation of the laminating layer, especially at the portion where is subject to a relatively large deformation, such as the riveted portion.

In the present invention, the ratio of the maximum to the minimum value of elastic modulus (sonic modulus) in the in-plane direction of the colored film and printed film, namely the maximum elastic modulus ratio of the film, is preferably in the range from 1.00 to 1.50, more preferably from 1.00 to 1.20. When the maximum elastic modulus ratio is more than 1.50, ripping of the film tends to occur in the direction of maximum elastic modulus ratio, namely in the direction of the main axis of orientation, at the middle part of the can end where is subject to a large deformation when the tab is set, and this tends to cause defective laminating.

The film containing a color pigment and/or a color dye (hereinafter, called "colored film") constituting the first aspect of the present invention is explained below.

In the present invention, especially when the metal can is a beverage can, the colored film is brought into direct contact with the user's lips when he tries to drink the content after opening the can. Therefore, it is preferable that the colored film has good food sanitary quality. The color pigment and color dye used for such a colored film are also required to be recommendatory in food sanitation. As the color pigment and color dye used in the present invention, those approved by the U.S. Food and Drug Administration (FDA), such as phthalocyanine blue colorant, anthraquinone yellow and red colorants, red iron oxide and the like are preferred. The content of such pigment and dye in the film may be properly decided according to the purpose of use, but in order to maintain the desired film strength, the content of such pigment and dye is usually not more than 20 wt %, preferably not more than 15 wt %. Where no hiding effect is required, the pigment and dye content is preferably not more than 2 wt %.

It is also preferable that the colored film of the present invention has a sublimation index of not more than 3. When the sublimation index is more than 3, the pigment may separate out and sublime from the inside of the colored film during the can end production process to contaminate the producing equipment. In case where the colored film is applied to the can end of a beverage can vended in a heated state, such as a coffee or tea can, the sublimation index of the film is preferably not more than 2. Definition of the sublimation index is given in the section of the Examples shown later.

A pigment having an opacifying effect may be blended in the colored film of the present invention. In case where it is desired to hide the color of the base metal from the aesthetic reason, it is preferable to contain in the film a pigment with a high opacifying effect, such as titanium dioxide, china clay, carbon black or the like, to produce the desired color while hiding the base metal color. In this case, the white light opacifying degree of the film is preferably not less than 0.4, more preferably not less than 0.8. The "opacifying degree" means a common logarithm of the value obtained by dividing the strength of incident light by the strength of transmitted light. If an opacifying degree of not less than 0.4, the opacifying effect may be sufficient in almost all purposes of use.

A pattern or other drawing may be printed as desired on the colored film of the present invention, either on one side or on both sides thereof. In case where such a print is made on the side opposite to the base metal attached side, it is preferred to provide a protective layer for protecting the printing ink layer. As a resin forming the protective layer, a thermosetting resin such as epoxy resin or acrylic resin may be used. The printing techniques usable in the present invention are described in the explanation of the second aspect of the present invention.

The method for laminating the external surface of a metal can end substrate with the colored film of the present invention is not specified, for instance, there can be used the following methods: (1) a method of using an epoxy-phenol-type thermosetting adhesive, and (2) a method of using as an adhesive layer, the thermal adhesive polyester layer formed as one of the surface layers of the laminated film by coextrusion. The solvent-free method (2) preferred in view of the environmental effect. This method (2) is described in the explanation of the third aspect of the present invention.

The film on which a print has been made printed film (hereinafter, called "printed film") constituting the second aspect of the present invention is explained.

In the present invention, printing on the polyester film surface can be conducted by using various known printing techniques such as gravure printing, offset printing, flexographic printing, screen printing, etc. Among them, gravure printing is preferred because of stabilized color tone of the printed lots and high image quality. In the present invention, since printing is conducted not only on a metal surface but also on the polyester film surface, there is no need of using a high-viscosity ink for metal surface printing. Drying of the printed layer is effected by heating to a temperature of usually around 200° C. with hot air.

In case where the most part of the metal can end surface is occupied by a same color, that is, in case where there is a ground color, various kinds of dye and pigment, such as phthalocyanine, anthraquinone, red iron oxide, etc., may be contained in the polyester constituting the printed film to make desired coloration. This has been described in the explanation of the first aspect of the present invention. It is also preferred to provide a primer laminating layer having high adhesiveness to the printing ink on the polyester film surface where printing is conducted during or after the polyester film forming process. It is also preferable to provide a protective coat layer of a thermosetting resin on the printed layer for protecting this layer.

The method for laminating the external surface of a metal can end substrate with the colored film of the present invention is not specified, for instance, there can be used the following methods: (1) a method of using an epoxy-phenol-type thermosetting adhesive, and (2) a method of using as an adhesive layer, the thermal adhesive polyester layer formed as one of the surface layers of the laminated film by coextrusion. The solvent-free method (2) preferred in view of the environmental effect. This method (2) is described in the explanation of the third aspect of the present invention.

The colored film and printed film described in the explanations of the first and second aspects of the present invention can be produced in the following exemplified way. First, each pellet of the starting materials of polyethylene terephthalate and thermal adhesive copolymer polyethylene terephthalate, is melted and coextruded by the extruders, and quenched to a temperature below the glass transition point of both layers to make an amorphous sheet. The obtained sheet is stretched approximately 2.5 to 4 times in the machine direction at 80 to 100° C. by a roll stretcher, and after providing an acrylic resin primer laminating layer for enhancing the printing ink adhesivity, the sheet is further stretched approximately 3.5 to 4 times in the transverse direction at 90 to 120° C. by a tenter and then heat-set at around 200 to 230° C. in the tenter. Printing is conducted on the thus obtained plain film by a printer and then a top coat is provided thereon.

The film on which a print has been made (hereinafter, "printed film") constituting the third aspect of the present invention is explained.

The base of the printed film constituting the third aspect of the present invention is a coextruded laminated film comprising a polyester (A) layer and a polyester (B) layer described below.

In the solvent-free method (2) in the above explanation of the methods for laminating the external surface of metal can end substrate with the colored film and the printed film of the first and second aspects of the present invention, the said thermal adhesive polyester layer correspond to the polyester (B) layer. And further, printing can be conducted on the polyester (B) layer by means of the method described below.

The polyester (A) layer comprises a polyester in which the percentage of the ethylene units or ethylene naphthalate units to the whole ester units is not less than 85 mol %. The "ester unit" means a unit corresponding to a structure in which one dicarboxylic acid and one diol are condensed, and in the following description, either the ethylene terephthalate unit or the ethylene naphthalate unit is called "main ester unit".

When the percentage of the main ester units in the polyester (A) layer is less than 85 mol %, the produced printed film may have insufficient strength and also the low-molecular weight components such as oligomers in the polyester separate out during vehemently heating, so that these components may bleed out in the printing process. The preferred percentage of the main ester units in the polyester (A) layer is not less than 95 mol %.

In the present invention, the polyester (B) layer comprises a polyester in which the percentage of the main ester units to the whole ester units is 65 to 90 mol %. When the percentage of the main ester units in the polyester (B) layer is less than 65 mol %, thermal adhesiveness of the layer becomes too high and there may occur thermal fusion of the layer when heated for drying of the ink in the printing process. On the other hand, when the percentage of the main ester units is more than 90 mol %, there may not be obtained sufficient thermal adhesiveness, so that it may be necessary to use a specific adhesive when laminating the external surface of can end substrate with the printed film. The preferred percentage of the main ester units in the polyester (B) layer is 75 to 85 mol %, more preferably 78 to 82 mol %.

Since the polyester (B) layer is functionally required to have thermal adhesivility (fusibility), it is preferable that the polyester is amorphous in its existing form. However, in case where an amorphous polyester is used, although there is no problem in thermal adhesivility, the amorphous polyester is thermal-adhered during drying before melting in the film forming process, so that it is impossible to enhance the drying efficiency by raising the drying temperature sufficiently, and it is impossible to apply to industrial mass production. Therefore, it is preferable that the polyester comprising the (B) layer has crystallinity in which the heat of fusion is not less than 10 J/g.

The base film comprising the polyester (A) layer and the polyester (B) layer can be produced by the following exemplified coextrusion laminating method. First, the pellets of the materials of the respective layers are melted and coextruded by the extruders and quenched to a temperature below the glass transition point of both layers to produce an amorphous sheet. The obtained sheet is stretched about 2.5 to 4 times in the machine direction at 80 to 100° C. by a roll stretcher, then further stretched about 3.5 to 4.5 times in the transverse direction at 90 to 120° C. by a tenter and heat set at around 200 to 230° C. in the tenter.

The thickness of the said (A) layer and (B) layer may be properly decided within the limits of the thickness (3 to 50 μm) of the printed film of the present invention by considering the function of the respective layers, but it is preferable that both layers are not less than 1 μm in thickness.

When the thickness of the polyester (A) layer is less than 1 μm, although there may be no bleedout from the inside of the said layer, it is impossible to sufficiently prevent separating and diffusion of the low-molecular weight components from the polyester (B) layer. The polyester (B) layer is thermal-laminated on the external surface of a metal can end substrate, so if the thickness of polyester (B) layer is less than 1 μm, the adhesion may be not sufficient and the laminating film may be peeled off at the tab attached portion where a large deformation is subject.

In the printed film of the present invention, the printed area percentage of the printed layer provided on the polyester (B) layer surface should be not more than 90%. The "printed area percentage" means the percentage of the printed area to the whole surface area of the printed film facing the external surface of the metal can end. When the printed area percentage is more than 90%, the film may not be laminated on the metal with sufficient strength by thermal adhesion of the polyester (B) layer even at the can end portion which is small in printed area compared with the body portion. The preferred range of the printed area percentage is not more than 60%, more preferably not more than 40%.

In the printed film of the third aspect, printing can be conducted on either the polyester (A) or (B) layer surface of the laminating polyester film. Especially, it is preferable to conduct printing on the surface of the polyester (B) layer having an ability of thermal laminating because it is not necessary to provide a protection layer on the printed surface.

The process of the production of the metal can end is the following exemplified way. The colored film and printed film of the present invention are thermal-laminated by laminating rolls or other means to a metal plate such as an aluminum plate constituting the metal can end substrate, and the aluminum plate laminated with the printed film is processed into a metal can end by a conventional method described in publications such as U.S. Pat. Nos. 5,059,460 and 5,093,208. Thermal laminating of the printed film of the present invention to the metal plate is conducted on the polyester (B) layer side formed by the coextrusion laminating method as described above. Therefore, the printed film of the present invention, unlike in the prior art, requires no process of coating with a thermosetting resin for thermal laminating, thus allowing simplification of the production process, and further, since no coating process is involved in the process, there arise no solvent-related environmental problems.

As described above, the colored polyester film for laminating the external surface of metal can end substrates used in the present invention makes it possible to produce the beverage can ends capable of offering excellent design effect at low cost and by a simple process. Also, since no step of coating of the external can end surface is required in the production of can ends, it is possible in the coating process to dispense with use of any organic solvent in the production process of the can end.

Further, by laminating the base can end metal with the polyester film on which various types of pattern have been printed and by molding this laminate into a can end, it is possible to provide a high-quality print on the external surface of the metal can end very easily and inexpensively. In addition, according to the present invention, since the process of coating the external can end surface can be omitted in the manufacture of can ends, it is possible to unnecessitate use of organic solvents in the can end production process, so that the present invention is of very high industrial value from the viewpoint of environmental protection, too.

EXAMPLES

The present invention is described in further detail with reference to the examples. These examples, however, are merely intended to be illustrative and not to be construed as limiting the scope of the invention in any way. In the following Examples and Comparative Examples, all "parts" are by weight unless otherwise noted. The following determination methods were used for the evaluation of the products.

(1) Film Thickness

A section of the film or film laminated on metal plate cut by a microtome was observed by a scanning electron microscope to determine the film thickness.

(2) Sublimation Index

A sheet of Copy Fighter A (a quality paper for PPC available from Mitsubishi Paper Mills Limited) was placed on a colored film laminated aluminum plate and the latter was induction heated to 180° C. under atmospheric pressure and left in this state for 30 minutes. The state of coloration of the paper surface on its aluminum plate contacted side was observed with the naked eye and by a color-difference meter (mfd. by Tokyo Denshoku Co. Ltd.) to determine the values of L*, a* and b* defined in JIS Z8729. Based on these results, the readiness for sublimation was classified according to the following 5-rank criterion.

1: The paper maintained the same white color as before the treatment in both naked eye observation and measurement by the color-difference meter.
2: Although no change of color could be observed with the naked eye, the value of a* or b* has changed.
3: Coloration could be confirmed with the naked eye when the paper was observed by placing it by the side of the non-treated paper.
4: Coloration could be confirmed without comparison with the non-treated paper in the open air on a clear day.
5: Coloration could be confirmed without comparison with the non-treated paper in the shade in the open air on a clear day.

(3) Maximum Elastic Modulus Ratio (C)

The rate of propagation of elastic wave in the in-plane direction of the film was measured by Sonic Sheet Tester SST-250 (mfd. by Nomura Shoji CO. Ltd.), with the maximum value indicated as Vmax and the minimum value as indicated Vmin. The maximum anisotropy of elastic modulus in the film plane determined from the equation $C=Vmax^2/Vmin^2$ was shown as maximum elastic modulus ratio.

(4) Printed Area Percentage

The opaque area was determined by an image analysis system (QUANTIMET 500+ mfd. by Leica Cambridge Ltd.), and the percentage of the opaque area to the total area was shown as printed area percentage.

(5) Polyester Unit Evaluation

The sample polyester was dissolved in a deuteration solvent (such as $CF_3COOD$) capable of dissolving the sample and its chemical shift was determined by 1H-NMR, from which the respective ester unit species and their ratios were calculated.

In order to evaluate the polyester unit of each layer, the layers other than the one to be evaluated were removed by plasma treatment, isolating the desired layer.

(6) Heat of Fusion

Ten mg of polyester was set in a differential scanning calorimeter DSC-1 (mfd. by Perkin Elmer Co., Ltd.) and heated at a heating rate of 10° C./min in nitrogen gas, and the value obtained by dividing the amount of heat absorbed with melting of the polyester by the mass of the sample polyester was shown as heat of fusion (J/g).

(7) Proving Thermal Adhesive Layer Amorphousness

The layers other than the thermal adhesive layer were removed by plasma treatment, and the density of the obtained thermal adhesive layer was determined by a density-gradient tube. When the value obtained by dividing the density in the amorphous state of the polyester composing the thermal adhesive layer by the density of the thermal adhesive layer was not less than 0.97, the layer was evaluated to be amorphous based on the results of the previous polyester unit evaluation.

Preparation Example 1

(Preparation of Polyester A)

In a reactor, 100 parts of dimethyl terephthalate, 60 parts of ethylene glycol and 0.1 part of calcium acetate monohydrate were reacted for ester exchange. The reaction was started at 170° C. and the reaction temperature was gradually raised with evaporation of methanol till reaching 230° C. four hours later, at which point the ester exchange reaction was substantially ended.

Then, 0.04 parts of ethylene glycol slurry containing amorphous silica having an average particle size of 1.3 μm and phosphoric acid were added, followed by further addition of 0.04 parts of antimony trioxide to carry out polycondensation reaction. The temperature was gradually raised while lowering the pressure gradually till reaching 280° C. and 0.3 mmHg two hours later, and after the lapse of additional 2 hours, the reaction was ended to obtain polyester A containing 0.05 parts of silica.

Preparation Example 2

(Polyester B)

The same procedure as in Preparation Example 1 was conducted except that 75 parts of dimethyl terephthalate and 25 parts of dimethyl isophthalate were used in place of 100 parts of dimethyl terephthalate to obtain polyester B.

Preparation Example 3

(Polyester C)

The same procedure as in Preparation Example 1 was conducted except that 70 parts of dimethyl terephthalate and 30 parts of dimethyl isophthalate were used in place of 100 parts of dimethyl terephthalate to obtain polyester C.

Preparation Example 4

(Polyester D)

Spundye Blue-5 (a polyester containing 5 parts by weight of a phthalocyanine pigment, available from Dainippon Ink & Chemicals, Inc.) was used as polyester D.

Preparation Example 5

(Polyester E)

Plastic Color PESM Beige (available from Dainichiseika Color & Chemicals CO., Ltd.), a polyester containing anthraquinone, red iron oxide, titanium dioxide, carbon black, etc., was used as polyester E.

Example 1

A mixed polyester I prepared by mixing 62 parts of polyester A, 18 parts of polyester B and 20 parts of polyester D and a mixed polyester II prepared by mixing 20 parts of polyester A and 80 parts of polyester B were melted and coextruded at a discharge amount ratio of 5:1 (polyester I: polyester II) by the separate extruders and quenched to a temperature below the glass transition point of the polyesters to obtain an amorphous sheet. The obtained sheet was stretched 3 times in the machine direction at 80° C. by a roll stretcher. Then a coating solution comprising a water dispersion containing 3.75 parts of a 47.5:47.5:5.0 (molar ratio) copolymer of methyl methacrylate, ethyl acrylate and methylol acrylic amide and 1.25 parts of methoxymethylmelamine was applied on the polyester I side of the sheet to a dry coating thickness of 0.1 μm, and the coated sheet was stretched 4 times in the transverse direction at 100° C. by a tenter and then heat set at 220° C. to obtain a 12 μm thick laminated polyester film.

Gravure printing was conducted on the polyester I side of the laminated polyester film, and a protective layer comprising an epoxy-modified urea resin was provided thereon.

The thus obtained colored film was attached at its polyester II side to an aluminum plate by a laminator, and the laminated aluminum plate was molded into a beverage can end.

Example 2

The same procedure as in Example 1 was conducted except that a mixed polyester III prepared by mixing 80 parts of polyester B and 20 parts of polyester D was used in place of mixed polyester II to obtain a colored film, a colored film laminated aluminum plate and a colored film laminated aluminum can end.

Example 3

The same procedure as in Example 1 was conducted except that a mixed polyester IV prepared by mixing 65 parts of polyester A, 18 parts of polyester B and 17 parts of polyester E was used in place of mixed polyester I to obtain a colored film, a colored film laminated aluminum plate and a colored film laminated aluminum can end. When the can end was kept under a heated condition for a long time, the pigment in the laminating film separated out and sublimed in some samples.

Example 4

The same procedure as in Example 1 was conducted except that the tenter stretch ratio of the sheet was set at 1.2 to obtain a colored film, a colored film laminated aluminum plate and a colored film laminated aluminum can end.

In case where the direction of the maximum rate of propagation of elastic wave and the direction of the tab were not parallel to each other, there took place ripping of the film in the direction of the tab and in the vertical direction from the scored portion at the time of opening at a rate of 2 to 3 out of every 1,000 pieces of can end produced.

Example 5

The same procedure as in Example 1 was conducted except that a mixed polyester V obtained by mixing 32 parts of polyester A, 48 parts of polyester B and 20 parts of polyester C was used in place of the mix polyester I to obtain a colored film, a colored film laminated aluminum plate and a colored film laminated aluminum can end.

Scanning electron microscopical observation of the obtained colored film surface showed separating of the hexagonal plate crystals of ethylene terephthalate oligomer.

Example 6

The same procedure as in Example 1 was conducted except that a polyester (mixed polyester VI) prepared by mixing 52 parts of polyester A and 48 parts of polyester B was used in place of mixed polyester II to obtain a colored film.

Since the obtained colored film lacked thermal adhesiveness, this film was attached to an aluminum plate by using Adcoat (an adhesive available from Toyo Ink Co., Ltd.) and a curing agent and the laminated aluminum plate was molded into a can end. It was necessary to remove the solvent by evaporation for laminating.

Example 7

The same procedure as in Example 1 was conducted except for use of polyester E in place of mixed polyester II to obtain a colored film, a colored film laminated aluminum plate and a colored film laminated aluminum can end. In drying of the polyester before melting in the film forming process, it was impossible to set the drying temperature at a level higher than 70° C. for preventing thermal fusion in the dryer, and 50 hours were required for reducing the water content in the polyester below a prescribed level.

Example 8

The same procedure as in Example 1 was conducted except that the heat setting temperature was lowered to 180° C. to obtain a colored film, a colored film laminated aluminum plate and a colored film laminated aluminum can end. Since the film tended to crease because of insufficient adhesiveness during lamination, it was necessary to set the laminating roll pressure or the laminating temperature at a slightly higher level.

Comparative Example 1

The same procedure as in Example 1 was conducted except that the thickness of the colored film was made 2 μm to obtain a colored film, a colored film laminated aluminum plate and a colored film laminated aluminum can end. The film or the coat made thereof was susceptible to rip in the laminating and can end molding processes and would crease in the laminating process when the tension was lowered, so that it was hard to obtain a flawless finished product.

Comparative Example 2

The same procedure as in Example 1 was conducted except that the thickness of the colored film was made 100 μm to obtain a colored film and a colored film laminated aluminum plate. When the middle part of the laminated plate was drawn for setting a tab when molding the laminated plate into a can end, the laminating film was peeled off so that it was impossible to mold the can end.

Comparative Example 3

The same procedure as in Example 1 was conducted except that a mixed polyester produced by mixing 82 parts of polyester A and 18 parts of polyester B was used in place of mixed polyester I to obtain a colored film, a colored film laminated aluminum plate and a colored film laminated aluminum can end. Since no pigment was contained in the film, it was necessary to perform blue solid printing in the printing process, which necessitated increase of the printing cylinders and use of large quantities of printing ink and solvent.

The results obtained in the above Examples and Comparative Examples are shown in Table 1.

TABLE 1

|  | Overall thickness (μm) | Sublimation index | Maximum elastic modulus ratio | Laminated side layer Compositional ratio of copolymer (%) | Thickness (μm) |
|---|---|---|---|---|---|
| Ex.1 | 12 | 2 | 1.10 | 20 | 2 |
| Ex.2 | 12 | 2 | 1.10 | 20 | 2 |
| Ex.3 | 12 | 4 | 1.10 | 20 | 2 |
| Ex.4 | 12 | 2 | 1.80 | 20 | 2 |
| Ex.5 | 12 | 2 | 1.10 | 20 | 2 |
| Ex.6 | 12 | 2 | 1.10 | 12 | 2 |
| Ex.7 | 12 | 2 | 1.10 | 30 | 2 |
| Ex.8 | 12 | 2 | 1.10 | 20 | 2 |
| Comp. Ex.1 | 2 | 2 | 1.10 | 20 | 0.3 |
| Comp. Ex.2 | 100 | 2 | 1.10 | 20 | 17 |
| Comp. Ex.3 | 12 | 2 | 1.10 | 20 | 2 |

|  | Laminated side layer Heat of fusion (J/g) | Amorphous or not | Layer on the opposite side Compositional ratio of copolymer (%) | Thickness (μm) |
|---|---|---|---|---|
| Ex.1 | 20 | Amorphous | 4.5 | 10 |
| Ex.2 | 20 | Amorphous | 4.5 | 10 |
| Ex.3 | 19 | Amorphous | 4.5 | 10 |
| Ex.4 | 20 | Amorphous | 4.5 | 10 |
| Ex.5 | 20 | Amorphous | 12 | 10 |
| Ex.6 | 35 | Crystalline | 4.5 | 10 |
| Ex.7 | 0 | Amorphous | 4.5 | 10 |
| Ex.8 | 20 | Crystalline | 4.5 | 10 |
| Comp. Ex.1 | 20 | Amorphous | 4.5 | 1.7 |
| Comp. Ex.2 | 20 | Amorphous | 4.5 | 83 |
| Comp. Ex.3 | 20 | Amorphous | 4.5 | 10 |

Example 9

Mixed polyester VII prepared by mixing 82 parts of polyester A and 18 parts of polyester B and mixed polyester VIII prepared by mixing 20 parts of polyester A and 80 parts of polyester B were melted and coextruded at a discharged amount ratio of 5:1 (polyester VII:polyester VIII) by using the separate extruders and then quenched to a temperature below the glass transition point of the polyesters to produce an amorphous sheet. The obtained sheet was stretched 3 times in the machine direction at 80° C. by a roll stretcher.

Then a coating solution comprising a water dispersion containing 3.75 parts of a 47.5:47.5:5.0 (molar ratio) copolymer of methyl methacrylate, ethyl acrylate and methylol acrylic amide and 1.25 parts of methoxymethylmelamine was applied on the polyester I side of the sheet to a dry coating thickness of 0.1 μm. The thus coated sheet was then stretched 4 times in the transverse direction at 100° C. by a tenter and heat set at 220° C. to obtain a 12 μm thick laminated polyester film.

Gravure printing was conducted on the polyester VII side of the produced laminated polyester film and a protective coat layer of epoxy-modified urea resin was provided thereon. The thus obtained printed film was laminated at its polyester VIII side to an aluminum plate by a laminator and then molded into a beverage can end.

Example 10

The same procedure as in Example 9 was conducted except that a polyester (mixed polyester IX) prepared by mixing 62 parts of polyester A, 18 parts of polyester B and 20 parts of polyester D was used in place of mixed polyester VII to obtain a printed film, a printed film laminated aluminum plate and a printed film laminated aluminum can end.

Example 11

The same procedure as in Example 9 was conducted except that a polyester (mixed polyester X) prepared by mixing 80 parts of polyester B and 20 parts of polyester D was used in place of mixed polyester VIII to obtain a printed film, a printed film laminated aluminum plate and a printed film laminated aluminum can end.

Example 12

The same procedure as in Example 9 was conducted except that the tenter stretch ratio was changed to 1.2 to obtain a printed film, a printed film laminated aluminum plate and a printed film laminated aluminum can end. In this Example, in case where the direction of the maximum rate of propagation of elastic wave and the direction of the tab were not parallel to each other, there took place ripping of the film in the direction of the tab and in the vertical direction from the scored portion at the time of opening at a rate of 2 to 3 out of every 1,000 pieces of can end produced.

Example 13

The same procedure as in Example 9 was conducted except that a polyester (mixed polyester XI) prepared by mixing 52 parts of polyester A and 48 parts of polyester B was used in place of mixed polyester VII to obtain a printed film, a printed film laminated aluminum plate and a printed film laminated aluminum can end. In this Example, scanning electron microscopical observation of the printed film surface confirmed separating of the hexagonal plate crystals of ethylene terephthalate oligomer.

Example 14

The same procedure as in Example 9 was conducted except that a polyester (mixed polyester XII) prepared by mixing 52 parts of polyester A and 48 parts of polyester B was used in place of mixed polyester VIII to obtain a printed film. Since this printed film lacked thermal adhesiveness, it was laminated on an aluminum plate by using Adcoat (an adhesive produced by Toyo Ink Co., Ltd.) and the plate was molded into a can end. Removal of the solvent was necessary for adhering.

Example 15

The same procedure as in Example 9 was conducted except for use of polyester C in place of mixed polyester IX to obtain a printed film, a printed film laminated aluminum plate and a printed film laminated aluminum can end. In this Example, sticking of the film to the printing cylinders was seen occasionally during the printing process.

Comparative Example 4

The same procedure as in Example 9 was conducted except that the film thickness was changed to 2 μm to obtain a printed film, a printed film laminated aluminum plate and a printed film laminated aluminum can end. In this Comparative Example, the film or the coat comprising this film was susceptible to rip in the laminating and can end molding processes, and it also creased during lamination when the tension was lowered, making it hard to obtain a flawless finished product.

Comparative Example 5

The same procedure as in Example 9 was conducted except that the film thickness was changed to 100 μm to obtain a printed film and a printed film laminated aluminum plate. In this Comparative Example, when the middle part of the plate was drawn for setting a tab in molding the laminated plate into a can end, the laminating film was peeled off, so that it was impossible to mold the can end.

The results obtained in the above Examples and Comparative Examples are shown collectively in Table 2.

TABLE 2

| | | | Film attached side | | Opposite side | |
|---|---|---|---|---|---|---|
| | Overall thickness (μm) | Maximum elastic modulus ratio | Compositional ratio of copolymer (%) | Thickness (μm) | Compositional ratio of copolymer (%) | Thickness (μm) |
| Ex.9 | 12 | 1.10 | 20 | 2 | 4.5 | 10 |
| Ex.10 | 12 | 1.10 | 20 | 2 | 4.5 | 10 |
| Ex.11 | 12 | 1.10 | 20 | 2 | 4.5 | 10 |
| Ex.12 | 12 | 1.80 | 20 | 2 | 4.5 | 10 |
| Ex.13 | 12 | 1.10 | 20 | 2 | 12 | 10 |
| Ex.14 | 12 | 1.10 | 12 | 2 | 4.5 | 10 |
| Ex.15 | 12 | 1.10 | 30 | 2 | 4.5 | 10 |
| Comp. Ex.4 | 12 | 1.10 | 20 | 0.3 | 4.5 | 1.7 |
| Comp. Ex.5 | 12 | 1.10 | 20 | 17 | 4.5 | 83 |

Example 16

A mixed polyester XIII comprising a mixture of 84 parts of polyester A and 16 parts of polyester B and a mixed polyester XIV comprising a mixture of 20 parts of polyester A and 80 parts of polyester B were melted and coextruded at a discharge amount ratio of 13:2 (polyester XIII:polyester XIV) by the separate extruders and then quenched to a temperature below the glass transition point of the polyesters to obtain an amorphous sheet. The obtained sheet was stretched 3 times in the machine direction at 80° C. by a roll stretcher, then further stretched 4 times in the transverse direction at 100° C. by a tenter and heat set at 220° C. to obtain a 15 μm thick laminated polyester film. A pattern was gravure printed on the polyester XIV side of the obtained laminated polyester film at a printed area percentage of 35%. This printed film was thermal laminated at its polyester XIV side to an aluminum plate and molded. A beautiful can end could be produced. The printed film forming conditions are shown in Table 3.

Example 17

The same procedure as in Example 16 was conducted except that a mixed polyester XV comprising a mixture of 52 parts of polyester A and 48 parts of polyester B was used in place of mixed polyester XIII to obtain a printed film and a laminated aluminum plate and to produce a beautiful laminated can end. The printed film forming conditions are shown in Table 3.

Example 18

The same procedure as in Example 16 was conducted except for use of mixed polyester XV in place of mixed polyester XIV to obtain a printed film and a laminated aluminum plate and to produce a beautiful laminated can end. The printed film forming conditions are shown in Table 3.

Example 19

The same procedure as in Example 16 was conducted except for use of polyester C in place of mixed polyester XIV to obtain a printed film and a laminated aluminum plate and to produce a beautiful laminated can end. The printed film forming conditions are shown in Table 3.

Comparative Example 6

The same procedure as in Example 16 was conducted except that the film thickness was changed from 15 μm to 2 μm to obtain a printed film. Ripping of the film occurred repeatedly when laminated to the aluminum plate and it was impossible to obtain the elongated laminated aluminum plates with stability. The printed film forming conditions are shown in Table 3.

Comparative Example 7

The same procedure as in Example 16 was conducted except that the film thickness was changed from 15 μm to 100 μm to obtain a printed film and a laminated aluminum plate. When the middle part of the laminated plate was drawn for setting a tab, the laminating film was peeled off so that it was impossible to produce the desired metal can end. The printed film forming conditions are shown in Table 3.

Comparative Example 8

The same procedure as in Example 16 was conducted except that printing was conducted on the layer comprising mixed polyester XIII. When this printed film was laminated to an aluminum plate, the printing ink transferred to the laminating rolls to make the print light, and the ink on the laminating rolls further transferred to the portion where no printing was to be done, making it unable to obtain the desired laminated aluminum plate. The printed film forming conditions are shown in Table 3.

Comparative Example 9

The same procedure as in Example 16 was conducted except that the printed area percentage was increased to 98%. When it was tried to mold the laminated aluminum plate into a can end, the laminating film was peeled off frequently, so that it was impossible to produce the desired metal can end. The printed film forming conditions are shown in Table 3.

TABLE 3

| | Overall thickness (μm) | Printed side | Printed area percentage (%) | Surface of laminated side Compositional ratio of main ester unit (%) | Thickness (μm) | Surface on opposite side Compositional ratio of main ester unit (%) | Thickness (μm) |
|---|---|---|---|---|---|---|---|
| Ex.16 | 15 | Adhered side | 35 | 80 | 2 | 96 | 13 |
| Ex.17 | 15 | Adhered side | 35 | 80 | 2 | 88 | 13 |
| Ex.18 | 15 | Adhered side | 35 | 88 | 2 | 96 | 13 |
| Ex.19 | 15 | Adhered side | 35 | 70 | 2 | 96 | 13 |
| Comp. Ex.6 | 2 | Adhered side | 35 | 80 | 0.27 | 96 | 1.73 |
| Comp. Ex.7 | 100 | Adhered side | 35 | 80 | 13.3 | 96 | 86.7 |
| Comp. Ex.8 | 15 | Opposite side | 35 | 80 | 2 | 96 | 13 |
| Comp. Ex.9 | 15 | Adhered side | 95 | 80 | 2 | 96 | 13 |

What is claimed is:

1. A polyester film for laminating the external surface of a beverage can end substrate, which contains a color pigment, a color dye or a combination thereof, and has a thickness of 3 to 50 μm, the ratio of the maximum to the minimum value of elastic modulus in the in-plane direction of the film being 1.00 to 1.50.

2. The polyester film according to claim 1, moving a sublimation index not more than 3.

3. The polyester film according to claim 1 wherein a print matter formed on at least one side of the polyester film.

4. The polyester film according to claim 1, wherein said polyester film comprises at least two layers wherein one layer comprises a polyester having the ratio of the main ester units to the total ester units of not less than 95 mol %, and the other layer comprises of an amorphous polyester having the ratio of the main ester units to the total ester units of 75 to 85 mol %, and the heat of fusion of said film is not lower than 10 J/g.

5. A polyester film for laminating the external surface of a metal can end substrate, which has a thickness of 3 to 50 μm, printing being conducted on at least one surface of the film, and the ratio of the maximum value of elastic modulus in the in-plane direction of the film being 1.00 to 1.50.

6. The polyester film according to claim 5, wherein said polyester film comprises at least two layers wherein one layer comprises a polyester having the ratio of the main ester units to the total ester units of not less than 95 mol %, and the other layer comprises of an amorphous polyester having the ratio of the main ester units to the total ester units of 75 to 85 mol %.

7. A polyester film for laminating the external surface of a metal can end substrate, which comprises a laminated film and a printed layer, said laminated film having a 3 to 50 μm thickness and comprising:

an outer polyester (A) layer having the ratio of the ethylene terephthalate units or ethylene naphthalate units to the total ester units of not less than 85 mol %, and an inner polyester (B) layer having the ratio of the ethylene terephthalate units or ethylene naphthalate units to the total ester units of 65 to 90 mol %;

said printed layer being formed on the opposite surface of the (B) layer of said laminated film from the surface on which the (A) layer is laminated, with a printed area percentage of not more than 90%, such that said printed layer comes into direct contact with the metal can end substrate when said film is laminated thereto.

8. A metal can end comprising a metal can end substrate and the laminated film defined as in claim 7, wherein said film is coextruded.

9. A metal can having the metal can end defined as in claim 8.

10. The polyester film according to claim 7, wherein the printed area percentage is not more than 60%.

* * * * *